(12) United States Patent
Pierre et al.

(10) Patent No.: US 8,977,953 B1
(45) Date of Patent: Mar. 10, 2015

(54) CUSTOMIZING INFORMATION BY COMBINING PAIR OF ANNOTATIONS FROM AT LEAST TWO DIFFERENT DOCUMENTS

(75) Inventors: John M. Pierre, Pacifica, CA (US); Mark H. Butler, Moraga, CA (US)

(73) Assignee: Linguastat, Inc., Pacifica, CA (US)

( * ) Notice: Subject to any disclaimer, the term of this patent is extended or adjusted under 35 U.S.C. 154(b) by 900 days.

(21) Appl. No.: 11/698,444

(22) Filed: Jan. 26, 2007

Related U.S. Application Data (60) Provisional application No. 60/762,756, filed on Jan. 27, 2006.

(51) Int. Cl.
| | | |
|---|---|---|
| *G06F 17/00* | (2006.01) | |
| *G06F 17/27* | (2006.01) | |
| *G06F 17/30* | (2006.01) | |

(52) U.S. Cl.
CPC .......... *G06F 17/277* (2013.01); *G06F 17/2775* (2013.01); *G06F 17/2785* (2013.01); *G06F 17/3089* (2013.01); *G06F 17/30905* (2013.01)
USPC ........... 715/230; 715/255; 715/201; 715/234; 715/254

(58) Field of Classification Search
CPC ..... G10L 15/22; G10L 15/26; G10L 15/1815; G06F 17/27; G06F 17/28; G06F 17/30; G06F 17/271; G06F 17/277; G06F 17/2247; G06F 17/2755; G06F 17/2785; G06F 17/2881; G06F 17/3053; G06F 17/3089; G06F 17/30684; G06F 17/30719; G06F 17/30905; G06F 17/2775; Y10S 707/99933; H04L 67/02
USPC ........ 715/200–203, 205, 209, 229–234, 254, 715/255; 704/9; 709/202–207, 217–219; 707/706–757, 912, 999.2, 999.203; 706/45

See application file for complete search history.

(56) References Cited

U.S. PATENT DOCUMENTS

| | | | |
|---|---|---|---|
| 5,708,825 A | | 1/1998 | Sotomayor |
| 5,970,449 A | * | 10/1999 | Alleva et al. .................. 704/235 |
| 6,463,404 B1 | * | 10/2002 | Appleby ........................... 704/9 |
| 7,139,752 B2 | * | 11/2006 | Broder et al. ..................... 707/4 |
| 7,346,490 B2 | * | 3/2008 | Fass et al. ......................... 704/7 |
| 7,366,711 B1 | * | 4/2008 | McKeown et al. ..... 707/999.003 |

(Continued)

OTHER PUBLICATIONS

Soon, Wee Meng, et al., "A Machine Learning Approach to Coreference Resolution of Noun Phrases", 2001, pp. 1-24.*

(Continued)

*Primary Examiner* — Cesar Paula
*Assistant Examiner* — James H Blackwell
(74) *Attorney, Agent, or Firm* — Hickman Palermo Truong Becker Bingham Wong LLP (57) ABSTRACT

A system and method for obtaining information embedded in unstructured text is provided. The method comprising generating computer-readable annotations based on the unstructured text, at least one of the computer-readable annotations comprising an indication of a linguistic feature. A pair of the computer-readable annotations may be used to generate at least one computer-readable relation between the pair. The annotations and/or relations may be stored as characteristic data structures in a database. A query comprising at least one criterion may be received. In response to the query, an information result may be generated based on at least one of the characteristic data structures stored in the database.

55 Claims, 9 Drawing Sheets

(56) References Cited

U.S. PATENT DOCUMENTS

| | | | |
|---|---|---|---|
| 7,398,196 B1* | 7/2008 | Liu et al. | 704/1 |
| 7,558,778 B2* | 7/2009 | Carus et al. | 1/1 |
| 7,593,940 B2* | 9/2009 | Gruhl et al. | 1/1 |
| 2002/0078090 A1* | 6/2002 | Hwang et al. | 707/513 |
| 2003/0061028 A1* | 3/2003 | Dey et al. | 704/9 |
| 2003/0217335 A1* | 11/2003 | Chung et al. | 715/514 |
| 2004/0078190 A1* | 4/2004 | Fass et al. | 704/7 |
| 2004/0172237 A1* | 9/2004 | Saldanha et al. | 704/4 |
| 2004/0236730 A1* | 11/2004 | Frank | 707/3 |
| 2004/0243645 A1* | 12/2004 | Broder et al. | 707/200 |
| 2004/0261016 A1* | 12/2004 | Glass et al. | 715/512 |
| 2005/0086592 A1* | 4/2005 | Polanyi et al. | 715/512 |
| 2006/0112110 A1* | 5/2006 | Maymir-Ducharme et al. | 707/100 |
| 2006/0167689 A1* | 7/2006 | Maren | 704/240 |
| 2007/0156622 A1* | 7/2007 | Akkiraju et al. | 706/48 |
| 2007/0168380 A1* | 7/2007 | Chitrapura et al. | 707/102 |
| 2008/0033715 A1* | 2/2008 | Barklund et al. | 704/9 |
| 2008/0126080 A1* | 5/2008 | Saldanha et al. | 704/9 |
| 2008/0222511 A1* | 9/2008 | Kambhatla et al. | 715/230 |
| 2008/0222512 A1* | 9/2008 | Albornoz et al. | 715/230 |
| 2009/0049021 A1* | 2/2009 | Chitrapura et al. | 707/3 |
| 2009/0287476 A1* | 11/2009 | Johnson et al. | 704/10 |

OTHER PUBLICATIONS

Zhang, Z. et al.,"Learning Cross-Document Structural Relationships using Boosting," © Nov. 2003, ACM, pp. 124-130.*

Radev, D.,"A Common Theory of Information Fusion from Multiple Text Sources Step One: Cross-Document Structure," © 2000, ACM, pp. 74-83.*

Kukich, K.,"Design of a Knowledge-Based Report Generator," © 1983, in ACL '83 Proc. of the 21st annual meeting on Assoc. for Computational Linguistics, pp. 145-150.*

Dragomir R. Radev and Kathleen R. McKeown. 1998. Generating natural language summaries from multiple on-line sources. Comput. Linguist. 24, 3 (Sep. 1998), 470-500.*

Kathleen McKeown and Dragomir R. Radev. 1995. Generating Summaries of Multiple News Articles. SIGIR '95 Seattle WA USA. ACM, 74-82.*

Jim Cowie and Wendy Lehnert. 1996. Information Extraction. Comm. of the ACM, Jan. 1996, vol. 39, No. 1, 80-91.*

Dragomir R. Radev and Kathleen R. McKeown. 1997. Building a generation knowledge source using Internet-accessible newswire. In Proceedings of the fifth conference on Applied natural language processing (ANLC '97). Assoc. for Computational Linguistics, Stroudsburg, PA, USA, 221-228.*

Kathleen McKeown, Karen Kukich, and James Shaw. 1994. Practical issues in automatic documentation generation. In Proc. of the 4th conf. on Applied natural language processing (ANLC '94). Association for Computational Linguistics, Stroudsburg, PA, USA, 7-14.*

Dragomir R. Radev,"An Architecture for Distrubuted Natural Language Summarization," © 1996, In Proc. of the 8th Intl. Workshop on Natural Language Generation: Demonstrations and Posters, pp. 45-48.*

Alani, H. et al.,"Automatic Extraction of Knowledge from Web Documents," in Workshop on Human Language Technology for the Semantic Web and Web Services, 2nd Int. Semantic Web Conf. Sanibel Island, Oct. 20-23, 2003, 11 pages.*

Kim et al.,"Artequakt: Generating Tailored Biographies with Automatically Annotated Fragments from the Web," Presented at the Semantic Authoring, Annotation and Knowledge Markup (SAAKM) 2002 Workshop at the 15th European Conference on Artificial Intelligence (ECAI 2002), Jul. 22-26, 2002, pp. 1-6.*

McKeown, K. et al., "Tracking and Summarizing News on a Daily Basis with Columbia's Newsblaster," 2002, 6 pages.*

Goldstein, J. et al.,"Multi-Document Summarization by Sentence Extraction,", In Proceedings of the ANLP/NAACL Workshop on Automatic Summarization, 2000, pp. 40-48.*

White, M. et al.,"Multidocument Summarization via Information Extraction," In Proceedings of the HLT Conference, 2001, pp. 263-269.*

Alani et al.,"Using Protégé for Automatic Ontology Instantiation," In: Proc. of 7th Int. Protégé Conf, 2004.*

Reidsman et al.,"Cross Document Annotation for Multimedia Retreival," © 2003, 8 pages.*

Götz,T. and O. Suhre, "Design and implementation of the UIMA Common Analysis System," IBM Systems Journal, vol. 43, No. 3, 2004, pp. 476-489.

Gruhl D., et al., "How to build a WebFountain: An architecture for very large-scale text analytics," IBM Systems Journal, vol. 43, No. 1, 2004, pp. 64-77.

Holub M. and P. Mika, "MATES—an experimental linguistic database system," http://www.ldc.upenn.edu/annotation/database/papers/Mika_Holub/21.2.mika.pdf.

Bilotti M., "Annotations Database and Text Annotator: An Architectural Overview," http://guadalajara.lti.cs.cmu.edu/annotations_db/csc_visit.ppt., Feb. 22, 2005.

Bilotti M., "Annotations Database," http://guadalajara.lti.cs.cmu.edu/annotations_db/.

* cited by examiner

Digital SLR Cameras

| Product | Rating | image quality | lens | battery life | noise | color |
|---|---|---|---|---|---|---|
| Canon EOS 1D Mark II | ★★★★☆ | ★★★★☆ | | ★★★★☆ | ★★★★☆ | ★★★★☆ |
| Fujifilm FinePix S2 Pro | ★★★★☆ | ★★★★☆ | | | | ★★★★☆ |
| Kodak DCS Pro SLR/c | ★★☆☆☆ | | ★★★★★ | ǂ | ★★☆☆☆ | ǂ |
| Nikon D2X | ★★★★★ | | | | ★★★★★ | |
| Nikon D70s | ★★★★☆ | | ★★★★☆ | | | ★★★☆☆ |
| Olympus Evolt E-300 | ★★★★★ | ★★★☆☆ | | ★★☆☆☆ | ǂ | ★★★★☆ |
| Pentax *ist D | ★★★★☆ | ★★☆☆☆ | ★★★★★ | ★★★★☆ | | |
| Pentax *ist DS | ★★★★☆ | | ★★★★★ | | | |
| Pentax *ist DS2 | ★★★★★ | | | | | |
| Sigma SD10 | ★★★★★ | ★★★★★ | ★★★★☆ | | | ★★★☆☆ |

⎫
⎬ 802
⎭

Choose products:
- Nikon D70
- Nikon D70s
- Olympus E 20N
- Olympus E-1
- Olympus Evolt E-300
- Olympus Evolt E-500
- **Pentax *ist D**
- Pentax *ist DS
- Pentax *ist DS2
- Sigma SD10

Reset | Show All

Choose features:
- image quality
- lens
- battery life
- noise
- color
- price
- user friendly
- viewfinder
- software
- controls

Overall Rating: ★★★★ 4.3 out of 5
Value Rating: ★★★★ 4.3 out of 5

Strengths:
*(summarized from 62 reviews)*

- battery life is superior (16)
- easy controls (12)
- color (9)
- sharpness is excellent (9)
- user friendly (9)

900

Weaknesses:
*(summarized from 61 reviews)*

- software is slow (14)
- white balance (8)

902

Summary:
*(summarized from 62 reviews)*
Sentiments

- Intuitive, Good Build, quiet, comfortable, quick enough, excellent exposures, sharp images, great flash exposure, superb raw files.
- This is a Great camera for anyone taking up SLR digital photography, it's laden with features and the battery life is amazing, the D70 is also very good but lacking in a few of the l better flash sync speed for anyone who wants to do a lot of outdoor flash work.
- The camera controls and menus are well thought out.
- And the image quality is super although I must say they are a bit on the soft side.
- OUTSTANDING BATTERY LIFE.

Applications

- I use Lexar high speed CF's 40X and the camera is fast but doesn't beat a motordrive though, which in any case i don't need because i take portraits, nature and architecture shots.
- I have shot mostly black and white landscapes and nature photography, and few colors (no slides).

Comparisons

- Focusing Speed and accuracy is easily the D100's strongest point and leaves the S2, D60 and 10D in the dust on accuracy alone (although the S2 is a close 2nd).
- Like many people I looked at the Canon 10D and the Nikon D100 when I was thinking about buying a Digital SLR.
- AUTO FOCUS VERY QUICK, AND INSTANTANEOUS SHUTTER RELEASE, COMPARED WITH 3 PREVIOUS DIGITALS, ONE SLR AND TWO P & S. ONLY POSSI

FIG. 9

CUSTOMIZING INFORMATION BY COMBINING PAIR OF ANNOTATIONS FROM AT LEAST TWO DIFFERENT DOCUMENTS

RELATED APPLICATIONS

This U.S. nonprovisional patent application claims priority benefit of U.S. Provisional Application No. 60/762,756 filed Jan. 27, 2006 which is incorporated herein by reference.

BACKGROUND

1. Field of the Present Invention

The present invention relates generally to information processing and more specifically to obtaining information embedded in unstructured text.

2. Description of Related Art

A large amount of electronic information is freely accessible via public sources such as the Internet. Data may be retrieved from Internet sources using a search engine such as Google, Ask, Msn, AOL, Yahoo!, or the like. The search engines typically receive a query from a user and generate a list of relevant web pages. This list may contain millions of web pages. For example, a search for "Toyota Prius" on Google returns about 2,100,000 results. A researcher may browse hundreds of these documents before being able to assemble a report that includes relevant and comprehensive information. Additionally, users and/or organizations may generate additional data. The ability to sift quickly through large amounts of information is becoming increasingly valuable.

Data may be stored in a database which may be managed by a database management technology or application. Databases may also be used to store proprietary information that is not publicly known such as inventory, customer lists, and supplier lists.

Further, technologies for natural language processing are available. These technologies include software for converting among various file formats and character encoding schemes, part-of-speech tagging, syntactic parsing, information extraction, automated text categorization, word sense disambiguation, information extraction, text segmentation, relationship mining, event detection, toponym resolution, and creation and management of taxonomies, lexicons, and knowledge databases.

Technologies for creating and presenting information stored in databases or included in lengthy documents is available. These technologies include natural language generation, text summarization, and information visualization systems.

While these applications may be used to meet specific needs, they do not provide a unified way of distilling and presenting key information from large amounts of data. There exists a need for an electronic text information system that is able to present data from many different sources as a customized, personalized, and targeted view of key information.

SUMMARY

A system and method for generating and presenting key information is provided. The method comprises accessing one or more information sources having unstructured content. From the unstructured content, computer-readable annotations are generated that indicate a linguistic feature. Computer-readable relations are then generated from the annotations. Annotations and relations are stored in a database. A query with one or more criterion is received. In response to the query, the computer-readable annotations and or relations may be transformed. An information result is generated in response to the query based on the annotation, relation, transformed annotation or relation, or a combination thereof.

The method may include providing a link to the plurality of information sources in order to generate the information result. The computer-readable annotations may indicate a relationship between a plurality of the linguistic features. The method may include generating a parse tree identifying a phrase grouping associated with the unstructured content or resolving a text string associated with the unstructured content. Each of the computer-readable annotations and relations may be scored. A second information result may be generated based on a template associated with the query.

BRIEF DESCRIPTION OF THE DRAWINGS

FIG. 7 depicts an exemplary screenshot of a generated competitive intelligence briefing according to various embodiments;

FIG. 9 depicts an exemplary screenshot of a generated product summary according to various embodiments.

DETAILED DESCRIPTION

A system, method, and computer readable medium for generating an information result from unstructured text is provided. The information result is based on electronic textual data collected from one or more sources such as websites, databases, feeds, and message boards. The collected information is used to generate annotations and relations indicating a factoid present in the source. The annotations and relations are generated such that a computing device may access the annotations and relations after they are stored in an annotations/relations database. The annotation and relations may be generally referred to as "characteristic data structures." The computing device, upon receiving a query, or set of queries, from a user, may process the annotations and/or relations to determine whether the factoid is relevant, redundant, or conflicting with other factoids. The computing device may select the most relevant annotations and/or relations and transform the selected annotations and/or relations into a user-readable information result or machine-readable information result containing information from a portion of the one or more than one sources. Multiple types of information results may be generated based on the user's preference and/or the type of the query.

The generation of the information result may provide information such that it is more valuable to the user, that it is easier to apply to a current situation, and/or the information itself is processed more cost-effectively.

Figure 1:
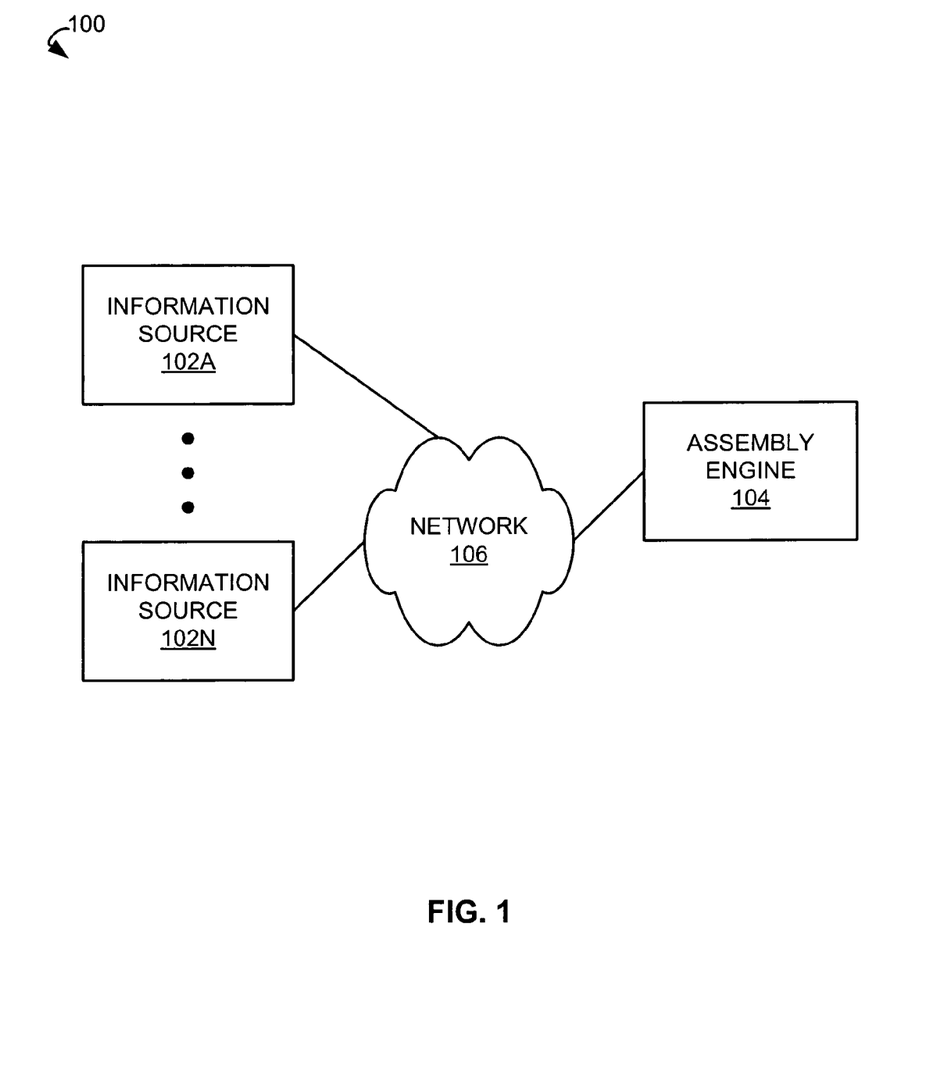
FIG. 1 depicts an exemplary environment in which various embodiments may be practiced.

FIG. 1 depicts an exemplary environment 100 in which various embodiments may be practiced. The environment 100 comprises information sources 102A through 102N and assembly engine 104 coupled via a network 106. The network 106 may comprise a public network, such as the Internet, and/or a private network.

The information sources 102A through 102N may comprise any electronic information source including websites, internal databases, feeds, sensors, and the like. The information source 102A may comprise data such as text documents, images, audio, video, or the like. In some embodiments, the data may comprise processed or unprocessed sensor data. The data may be located in electronic documents, personal communications, closed captioned video text, audio files, and the like. Examples of the personal communications include email, chat streams, text messages, voicemail, and the like.

The assembly engine 104 comprises a computing device, such as a personal computer that may access the information sources 102A through 102N via the network 106. The assembly engine 104 receives data from the information sources 102A through 102N and processes the data to generate a briefing that is readable by a user of the assembly engine 104. In some embodiments, the assembly engine 104 may be coupled to one or more external databases. In some embodiments, various modules within the assembly engine 104 may operate in parallel on multiple computing devices coupled via the network 106.

The environment 100 may comprise other elements not disclosed herein. The environment 100 may comprise a plurality of assembly engines 104. Further, the environment 100 may comprise any number of information sources 102A through 102N.

Figure 2:
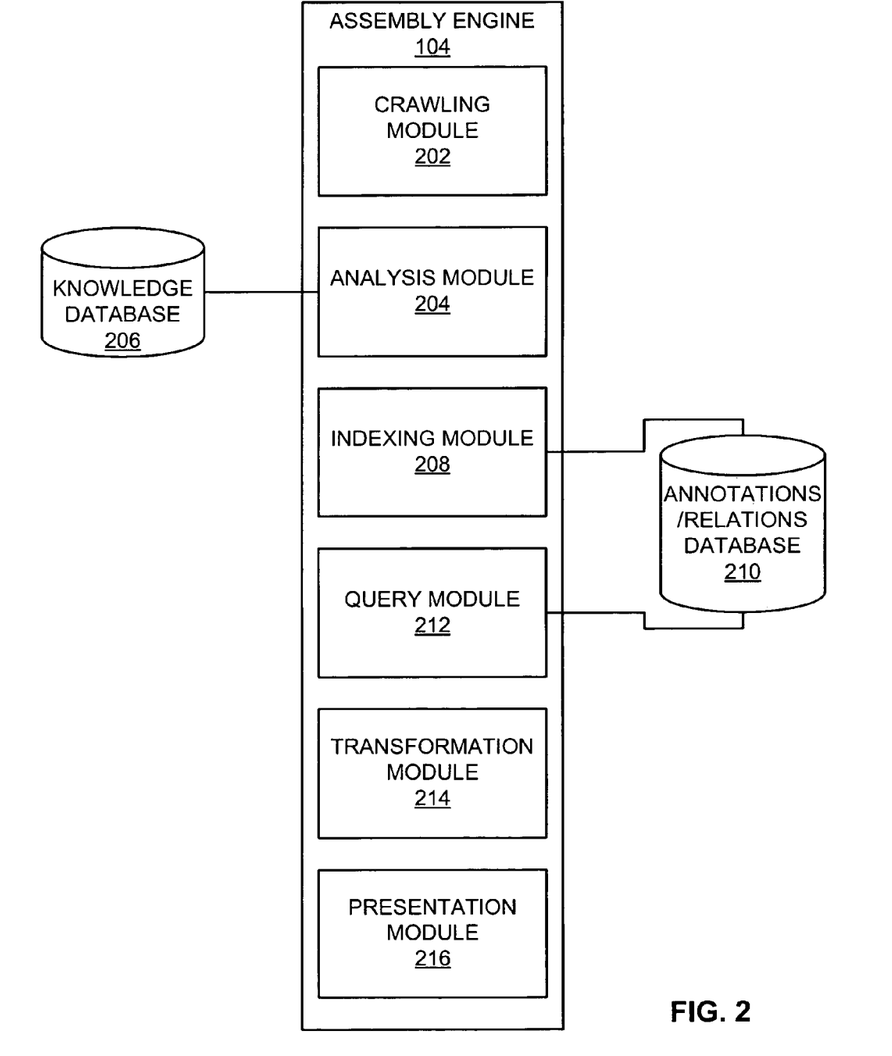
FIG. 2 depicts a block diagram of an exemplary assembly engine according to various embodiments.

FIG. 2 depicts a block diagram of an exemplary assembly engine 104 according to various embodiments. The assembly engine 104 comprises modules which may be implemented as software, hardware, and/or firmware. The assembly engine 104 is configured to receive information from the information sources 102A through 102N and generate an information result in response to a query, or set of queries, received from a user. The assembly engine 104 may comprise a crawling module 202, an analysis module 204, an indexing module 208, a query module 212, a transformation module 214, and a presentation module 216. The assembly engine 104 may be coupled to a knowledge database 206 and/or an annotations/relations database 210.

The crawling module 202 is configured to receive data from the information sources 102A through 102N. In some embodiments, the crawling module 202 may comprise a web crawler. The crawling module 202 may comprise a search engine configured to search for keywords and/or Boolean strings. The crawling module 202 may additionally access internal databases, receive sensor data, and/or access personal communications systems. Personal communications may include email, voicemail, text messages, instant messages, or the like. The crawling module 202 may receive text, image, audio, and/or video data.

The analysis module 204 is configured to identify and codify linguistic features and structure from unstructured content to generate annotations and relations. The unstructured content may comprise non-textual content that may be converted into unstructured text. The unstructured text is text that is not processed and may be read by a user. A news article is an example of unstructured text. The analysis module 204 may comprise one or more linguistic processors implemented as a chain of cascading finite state machines, pattern matching algorithms, and/or classification algorithms and the like. The linguistic processors may be trained to perform specific tasks using statistical machine learning or configured manually. Linguistic processors are employed to perform various tasks and analyze different aspects of the content to generate the annotation and relations.

For example, a first finite state machine may be configured to extract text from unstructured content which may be derived from a variety of formats including electronic documents, personal communications, closed-caption video text, audio files, or the like. To illustrate, a speech-to-text component may convert spoken audio into machine readable text. An optical-character-recognition component may convert images into machine readable text data. A handwriting-recognition component may convert text written in free hand (including "electronic ink") into machine-readable text data. Virtually any type of electronic data including video, audio, and sensor data may be converted into unstructured text using a component that maps arbitrary input data into text labels and/or descriptive text.

Another finite state machine within the analysis module 204 may classify unstructured information into segments for further text processing. Types of text segments to be identified include complete sentences, lists of items, bullet point lists, tables, bibliographies, footnotes, titles, paragraphs, chapter and section headings, figure captions, email headers, signature sections, attachments, conversation boundaries, incomplete sentences, sentence fragments, or the like. Based on an associated type of text segment associated with the text segment, the text segment may be routed to different finite state machines for further processing.

Another finite state machine may tokenize text segments into words, punctuation, and white-space. Features may be assigned to tokens including, for example, orthographic features such as capitalization and numerals, character length, part of speech, relative position of tokens in the source document, and a pointer to an offset or byte position of the token in the original document file. Text segments may be further divided into linguistic segments including sentences, sentence fragments, questions, quotations, utterances, list items, or the like by configuring and applying a parser configured to detect and identify boundaries of each type of segment.

Linguistic segments may be parsed using a statistical parser to produce a parse tree identifying phrase groupings including noun phrases, verb phrases, adjective phrases, prepositional phrases, clauses, or the like. The parse tree may be further analyzed to reveal relationships between linguistic elements including subject-verb-object, modifier, prepositional, or the like. Parse trees may be represented in a canonical form for comparison. Parse trees may be converted into dependency trees. Dependency trees may store data indicating information such as "who did what to whom, where, when." Linguistic segments and/or parse trees (including dependency trees) may be further parsed into semantic trees which encode a predicate-argument structure of the information.

Pattern matching may be applied to detect spans of text that match linguistic patterns and assign a named annotation to matching text spans. Annotations may include pointers to the beginning and/or end of the text span. Annotations may also include descriptive information such as an annotation type or arbitrary features expressed as name-value pairs. Patterns may be based on the original text and/or assigned annotations and features. Chains of patterns may be formed to match complex grammatical structures and detect higher level linguistic structures such as semantic relationships, discourse relationships, and the like.

The knowledge database 206 may store data used by the analysis module 204 to generate computer-readable annotations based on the unstructured content. The knowledge database 206 may comprise data used by the finite state machines, for example. The knowledge database 206 may be separate from the analysis module 204 as shown, or may be part of the analysis module 204. Further, the knowledge database may be embodied in multiple databases. The knowledge database 206 further comprises resolvers.

Resolvers may convert text strings into normalized concepts or entities. Various resolvers may identify and resolve specific types of concepts. A resolver may receive a text string to be resolved and determine a set of one or more words or phrases to be resolved by performing a lookup into the knowledge database 206. Additional context taken from the source document (relationships or co-occurrence with other entities for example) may be used to resolve ambiguities.

Various types of resolvers may be used. For example, a date/time resolver may resolve date and time text strings into numerical date/timestamp values by pattern matching and/or mapping text forms to numerical forms. To illustrate, "March" may be resolved to "03", "twelve" may be resolved to "12", and "two weeks ago today" may be processed as an instruction to subtract fourteen days from a current date. A geographic resolver may resolve geographic place names, addresses, and other geographic references into geospatial coordinates such as longitude, latitude, or a bounding polygon.

A vocabulary resolver may resolve a vocabulary term to an entry in a thesaurus and determine a preferred synonym or other unique identifier. Similarly, a text string may be resolved into a unique concept identifier or synonym using a semantic network. An identification resolver may resolve proper names, nicknames, and pronouns (e.g., "he", "she", "it" and other anaphora) that refer to the same person or individual into a preferred name or unique identifier, such as a Social Security number, or employee/customer ID. This resolver may further resolve proper names, abbreviations, and pronouns that refer to the same company or organization into a preferred name or unique identifier, such as a stock symbol or registered name. Likewise, proper names, brand names, model numbers and pronouns that refer to the same product may be resolved into a preferred full name or unique identifier, such as a UPC code, SKU number, or catalog number. Other examples include resolving gene-names to specific locations in a DNA sequence, resolving anatomy terms to a map of the human body, or the like.

The indexing module 208 is configured to codify and store linguistic features and/or structures for future access and/or analysis. The linguistic features and/or structures generated by the analysis module 204 are stored in computer memory or on disk in the annotations/relations database 210 which provides persistent and/or transient storage. In some embodiments, multiple assembly engines 104 may operate in parallel to process different documents separately and store the aggregated information in the annotations/relations database 210. Each assembly engine 104 as well as the annotations/relations database 210 may be operated and hosted on separate computers coupled together via the network 106. In some embodiments, the annotations/relations database 210 may be queried by a user while the analysis module 204 and/or the indexing module 208 store information. The annotations/relations database 210 may handle multiple collections of documents. Documents may be re-annotated, deleted, or added to the annotations/relations database 210. New data may be discarded by reverting to previous versions of the data.

The indexing module 208 may tabulate and/or index the annotations stored in the annotations/relations database 210 according to a schema. In some embodiments, the schema may comprise document records which indicate the name of the document, source location such as a URL or file path, a unique document identifier, and/or associated document metadata. The schema may also comprise token records which may indicate a document identifier, token position identifier, and/or an orthographic feature type such as lowercase, punctuation, part-of-speech, or the like. Annotation records, for example, may include a document identifier, start and end position of the text span, annotation type and annotation features such as name/value pairs, and a unique annotation identifier. Relation records may include a document identifier and annotation identifier for both the source and target of the relation and a relation descriptor type.

The query module 212 may identify and select annotations and/or relations stored in the annotations/relations database 210 based on matches to linguistic features and/or structures. The match may be based on a query received from the user. Queries may be specified by any combination of criteria which include matching tokens or words; matching token features such as part-of-speech or case-sensitive queries; matching annotation features such as sentences, phrases, or named-entities; matching proximity of tokens and/or annotations; matching document identifiers; matching annotation identifiers; matching resolved identifiers concept identifiers such as date/time stamp, or geospatial coordinates; matching relationships based on relationship type and/or connection to specific documents or annotations; or matching dependency trees which encode syntactic and/or semantic structures.

To generate a query, a user may use a query template comprising structured information including properties and/or values. Query templates may be pre-populated based on matching properties and/or values occurring in the annotations/relations database 210. For example, a user may provide a query specifying: "where a doctor performed a medical procedure on a patient?" The query may correspond to results indicating instances in which various doctors performed various medical procedures on various patients if the fields "doctor," "medical procedure," and "patient," are stored as properties in a template for medical treatment events. This query may be narrowed further using a query template to specify a doctor, medical procedure, or patient. For example a subsequent query may specify: "What patients did Dr. Harris perform cardiac surgery on?" In this example, "Dr. Harris," and "cardiac surgery" are examples of values associated with the properties "doctor" and "medical procedure," respectively.

As illustrated above, a query may comprise more than one query criterion. In these instances, each results set may be merged according to additional query logic such as required matches, Boolean operators, proximity searches, or the like. In some embodiments, query criteria may include matching of linguistic patterns (i.e. patterns of linguistic features).

Queries may be further specified by the user in order to retrieve snippets of information based on more specific query criteria, or to highlight and/or extract pieces of information from an existing set of retrieved results. For example, some query criteria may be used to retrieve sentences that describe corporate mergers, and additional query criteria may highlight the company being acquired, the company making the acquisition, the purchase price, or the like. Upon receiving a query, text snippets matching the query are identified and grouped into one results set. The results set may be made up of matches at any granularity within documents, sentences, phrases, or any text span defined by an annotation stored in the annotations/relations database 210.

In some embodiments, each item in a results set may be assigned a score using a scoring algorithm such as one based on the number of query criteria matched. Merged results sets are combined by adding scores for results set elements that occur in multiple results sets. Results sets may be sorted in rank order based on scores.

The transformation module 214 is configured to evaluate the importance of each annotation associated with the results set and organize the annotations accordingly. The transformation module 214 may transform the annotations into a different format, score the annotations based on a user query, and select and rank the scored annotations. A link to the information source 102A may be associated which links each annotation to the location of its associated text snippet in the information source.

To transform the annotations, the transformation module 214 changes matching annotations or text snippets into alternative forms of information which may be more useful to the end user. For example, this may include transforming mentions of a pronoun such as "he", "her", or "it" in text snippets into a preferred name based on the entity that the pronoun refers to, such as "Bob." Mentions of monetary values or other numbers may be transformed into a numerical equivalent. For example, "two and a half million dollars" may be transformed into "$2,500,000." Mentions of dates or times may be transformed into a numerical date or time stamp. Mentions of geographic places may be transformed into geospatial coordinates. In some embodiments, machine translation may be applied to transform text snippets in one language into another language (e.g., French into English).

In further embodiments, transformations may include transforming a particular concept into a concept identifier as specified in a thesaurus or semantic network. Likewise, mentions of a synonym may be transformed into the preferred term for the concept. For example, the word "automobile" may be transformed into the word "car." In some embodiments, any word or phrase may be transformed into an alternative word or phrase. For example, a spell checker may automatically replace the word "retreive" with "retrieve."

The transformations may process text snippets at a more abstract level. In some embodiments, text snippets may be pulled apart or parsed into sub-components based on a parsing algorithm or pattern matching. For example, text snippets that express an opinion about a product may be parsed into a sentiment and a feature or other attribute of the product. Linguistic structures of text snippets (e.g., subject-verb-object) may be mapped into conceptual/semantic structures (e.g., actor-action-recipient). Conceptual/semantic structures may be represented and stored in data structures such as trees or frame-slots or in the annotations/relations database 210 as a new set of annotation/relations.

In some embodiments, machine paraphrasing may be applied to re-phrase text snippets in an alternate manner of expression for different users. For example, technical jargon may be transformed into common terminology. In other embodiments, text snippets may be combined together to form new text snippets or conceptual structures. Sentences that are related by co-reference chains or lexical chains may be parsed to identify events, and descriptions. The parsed information from multiple sentences may be combined into a single conceptual structure or text snippet. For example, the text snippet comprising two sentences, "Mary went to the store. She bought bread." may be stored as two annotations indicating events "go" (tense=past, agent=mary, location=store), and "purchase" (tense=past, agent=mary, item=bread)). These two annotations may be combined and transformed into a single sentence "Mary went to the store and bought bread."

The transformation module 214 may evaluate the relative importance of the transformed annotations. The relative importance of each annotation may be determined by combining scores from a wide range of evaluation criteria. Transformation module 214 may assign a score to each transformed text snippet in a results set.

In some embodiments, the score may be assigned based on a relevance ranking metric or other user-defined criteria such as number of matches with known items in a controlled vocabulary or keyword list. In other embodiments, a score may be assigned based on the position in which a snippet appears within the source document or the type of formatting such as boldface, section heading, title, or the like.

Scores may be determined based on a vector space model of the results set. For example, a score may be assigned based on a similarity metric in a vector space model indicating how similar the text snippet is to a centroid of all text snippets in the results set. Another score may be assigned based the similarity metric in a vector space model indicating how similar the text snippet is to other text snippets in the results set. A third score may be assigned based on membership in a cluster and proximity to the cluster's centroid vector using a clustering algorithm such as K-means.

Each text snippet may also be evaluated to determine reliability and/or duplicity. For example, a score may be assigned based on how many pieces of other information corroborate the text snippet. In other embodiments, a score may be assigned based on how similar the text snippet is to other text snippets in the results set to remove duplicates. Additionally, a score may be assigned by computing an aggregate function of scores assigned by other scoring components, such as weighted average score. Other forms of scoring will be apparent to those skilled in the art.

The transformation module 214 may examine the one or more scores associated with a text snippet to determine whether to include the text snippet in a briefing. The determination may be based on user-defined rules, assigned scores, or other user-defined filtering criteria. For example, when evaluating text snippets that include comparisons among products, the determination may be based on the number of products appearing in the text snippet. For example, a specified threshold number of product name mentions (e.g., at least two products) may be required in order for a text snippet to be selected. In some embodiments, a filter may be applied to only select text snippets that contain at least one mention of a particular product. The selected text snippets may be ranked based on a combination of the scores and/or user-defined criteria.

The presentation module 216 generates a briefing for the user based on information received from at least one information source 102A. In alternative embodiments, the briefing may be formatted for machine readability for importation into a database application or computer system. Examples of briefings are shown in FIG. 6, FIG. 7, FIG. 8, and FIG. 9. A briefing may include links to the information source 102A. User preferences may be collected by the assembly engine 104 to customize information to the user. For example, aggregated information may be linked to the information sources 102A through 102N. The information source 102A may be formatted and/or highlighted to indicate the parts used to derive the aggregated information.

A briefing may be formatted for readability. This formatting may include extracting the most relevant piece of text from the information source 102A by selecting the most descriptive sentences or phrases. The text may be re-written according to heuristics that increase understandability and information content. In some embodiments, paraphrasing rules include replacing pronouns, abbreviations, and acronyms with the full name of the entity; replacing technical terms ("myocardial infarction") with non-technical terms ("heart attack") or visa versa; and/or converting sentences to sentence fragments that convey the key relevant information and using an ellipsis (" . . . ") to indicate where information has been filtered out.

The presentation module 216 may use natural language generation (NLG) to create human readable text information from abstract linguistic data structures. In some embodiments, dependency trees and semantic structures may be fed into a NLG engine such as FUF/SURGE or RealPro which converts the abstract knowledge into complete sentences using a grammar and scheme for linguistic realization of readable text. For example, the tree "give: TENSE=past, subject=John, object=donation" becomes "John gave a donation." Thus, the human readable text information may be distinguishable from the unstructured text that the information was distilled from.

The presentation module 216 may highlight key aspects of the information. Named entities such as people, companies, or products, and/or linguistic structures including noun phrases, semantic roles, or the like, may be highlighted according to user-specified criteria. In some embodiments, different entities and linguistic structures may have different highlight colors. Highlights may be applied to elements that matched a user query or other key information. For example, a query might return all sentences where a certain company was mentioned, but highlighting may be applied to indicate a mention of a company officer.

The presentation module 216 may apply descriptive headers to a briefing to label groups of aggregated information. Descriptive headers may be defined according to document structure (e.g., title, chapter, section, subsection, etc.) and displayed in the appropriate user-specified order with aggregated formatted information displayed under the descriptive header.

Figure 6:
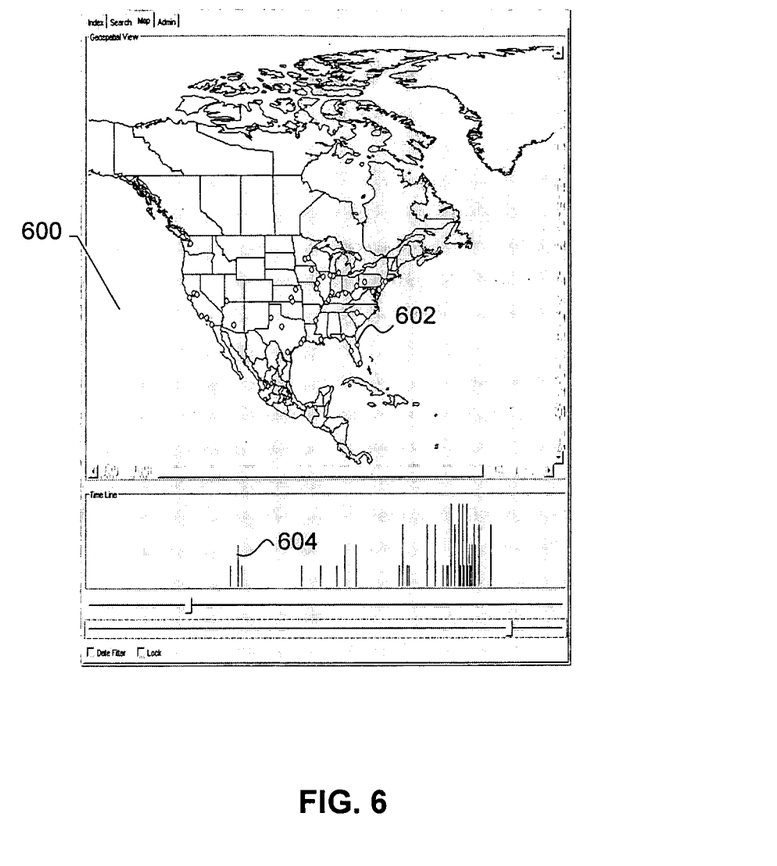
FIG. 6 depicts an exemplary screenshot of time and location results associated with a query according to various embodiments.
Figure 8:
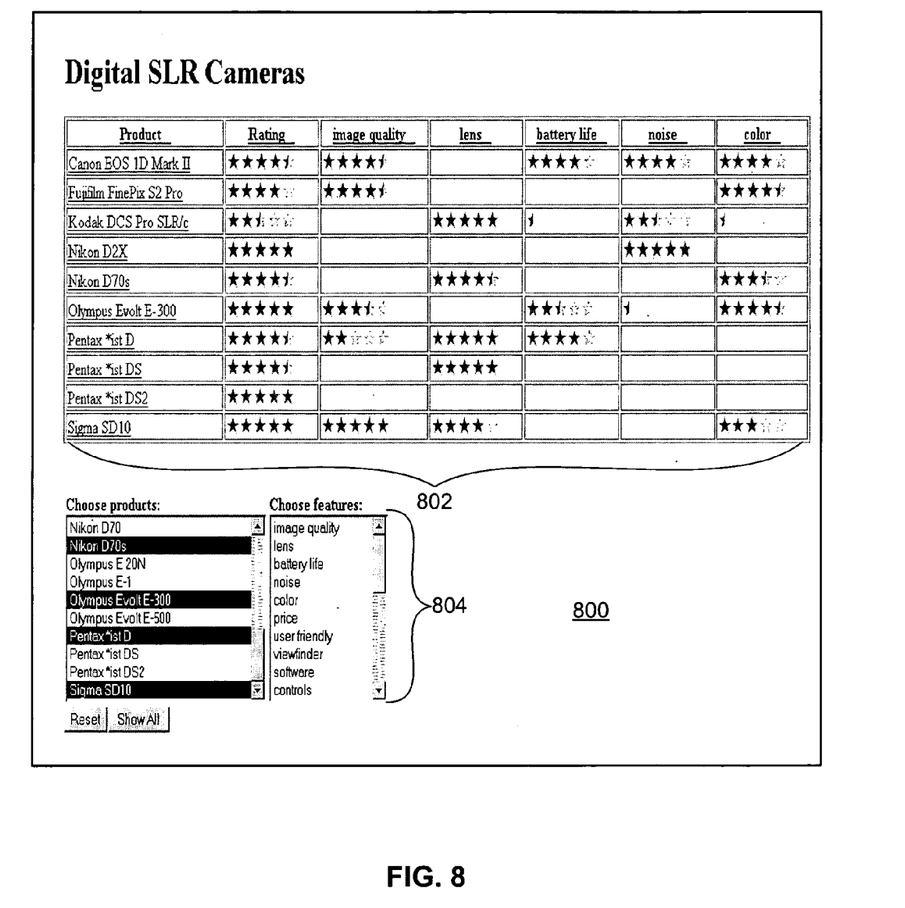
FIG. 8 depicts an exemplary screenshot of a generated product comparison matrix according to various embodiments.

The presentation module 216 may map information into icons or pictures. For example, time information may be mapped into a clock face or date information may be mapped into a calendar display or timeline, as shown in FIG. 6. In other embodiments, geographic information may be mapped into a map of an area where events took place, as also shown in FIG. 6. In further embodiments, aggregated opinions may be mapped into a rating scale, as shown in FIG. 8 and FIG. 9.

The presentation module 216 may group and/or organize information according to distinct conceptual dimensions. A clustering algorithm or other aggregation of results from multiple query criteria may be used to define, collect, organize, filter, and display underlying information according to a particular viewpoint associated with the user providing the criteria. Results collected from the query module 212 may be grouped according to these viewpoints. For example, information regarding employment law may be presented from an employer's viewpoint and/or from an employee's viewpoint. Thus, multiple users within a very large organization may obtain different sets of information from the same large collection of unstructured text.

The presentation module 216 may aggregate information by querying the annotations/relations database 210 to identify redundant information that has been consolidated. Redundant information may be collected into a single item for display that includes a descriptive label, a count of the number of redundant results that were consolidated, and/or links that point to the redundant results.

The presentation module 216 may, according to some embodiments, provide a briefing in multiple display and/or output formats. For example, the information may be displayed as text, images, graphics, tables, or the like. Multiple output formats include electronic documents, messages, feeds, database files, audio files, or the like.

Figure 3:
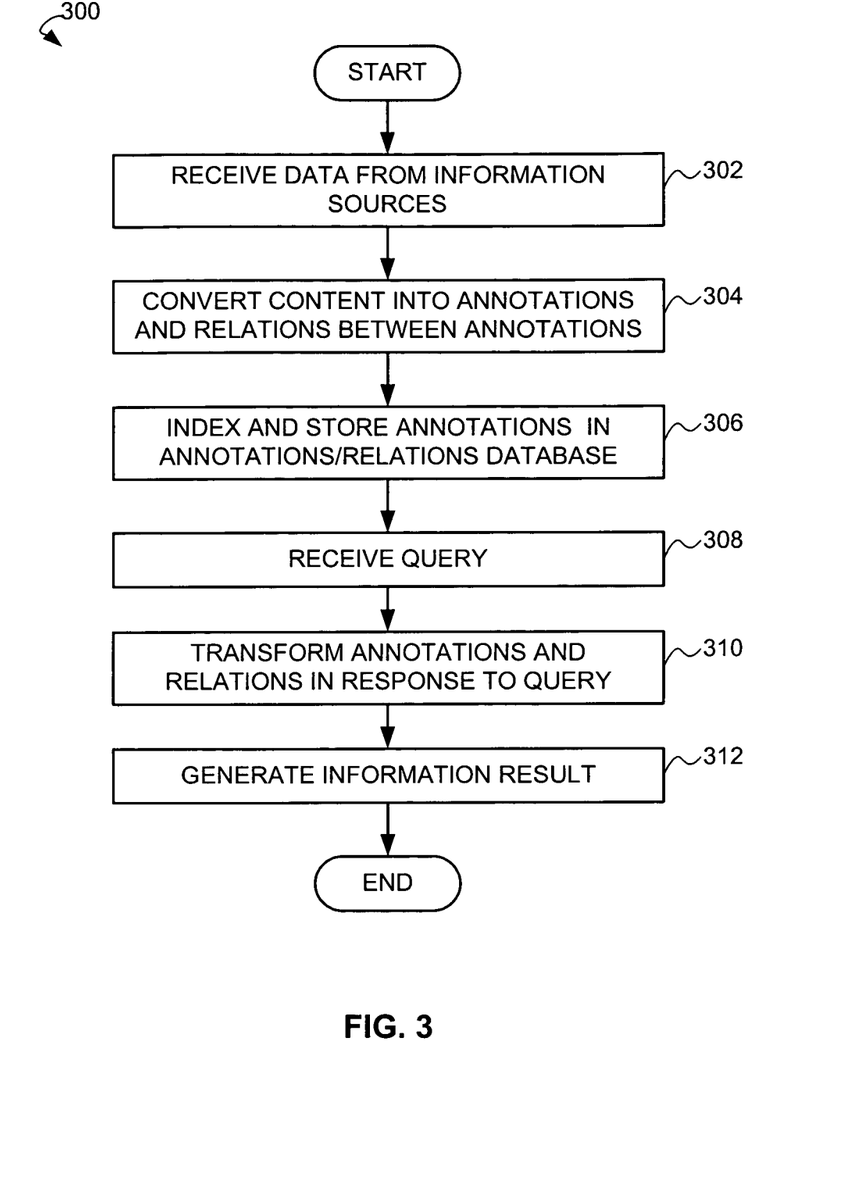
FIG. 3 depicts a flowchart illustrating an exemplary method for generating an information result according to various embodiments.

FIG. 3 depicts a flowchart illustrating an exemplary method 300 for generating an information result according to various embodiments. The method 300 may be performed by the assembly engine 104. The method 300 may be used to generate a briefing based on information from a plurality of information sources 102A through 102N.

In step 302, the data may be received from the information sources 102A through 102N by the crawling module 202. The data may comprise unstructured content such as text, images, audio and/or video. In step 304, the data may be converted into annotations and/or relations between the annotations by the analysis module 204. The annotations and/or relations are machine-readable and may be generated based on the knowledge base 206. In step 306, the annotations and/or relations may be indexed by the indexing module 208 and stored in the annotations/relations database 210. In step 308, the query module 212 receives a query from a user of the assembly engine 104. In alternative embodiments, step 308, receiving the query, may be performed before, or concurrently with, steps 302, 304 and/or 306. In some embodiments, the transformation engine 214 transforms annotations and/or relations associated with the query into user readable information in step 310. In alternative embodiments, the transformed annotations may be exported as machine readable information to another application. In step 312, the presentation module 216 may generate a presentation of the transformed annotations as a briefing. It should be noted that step 312 may be optional in some embodiments.

Figure 4:
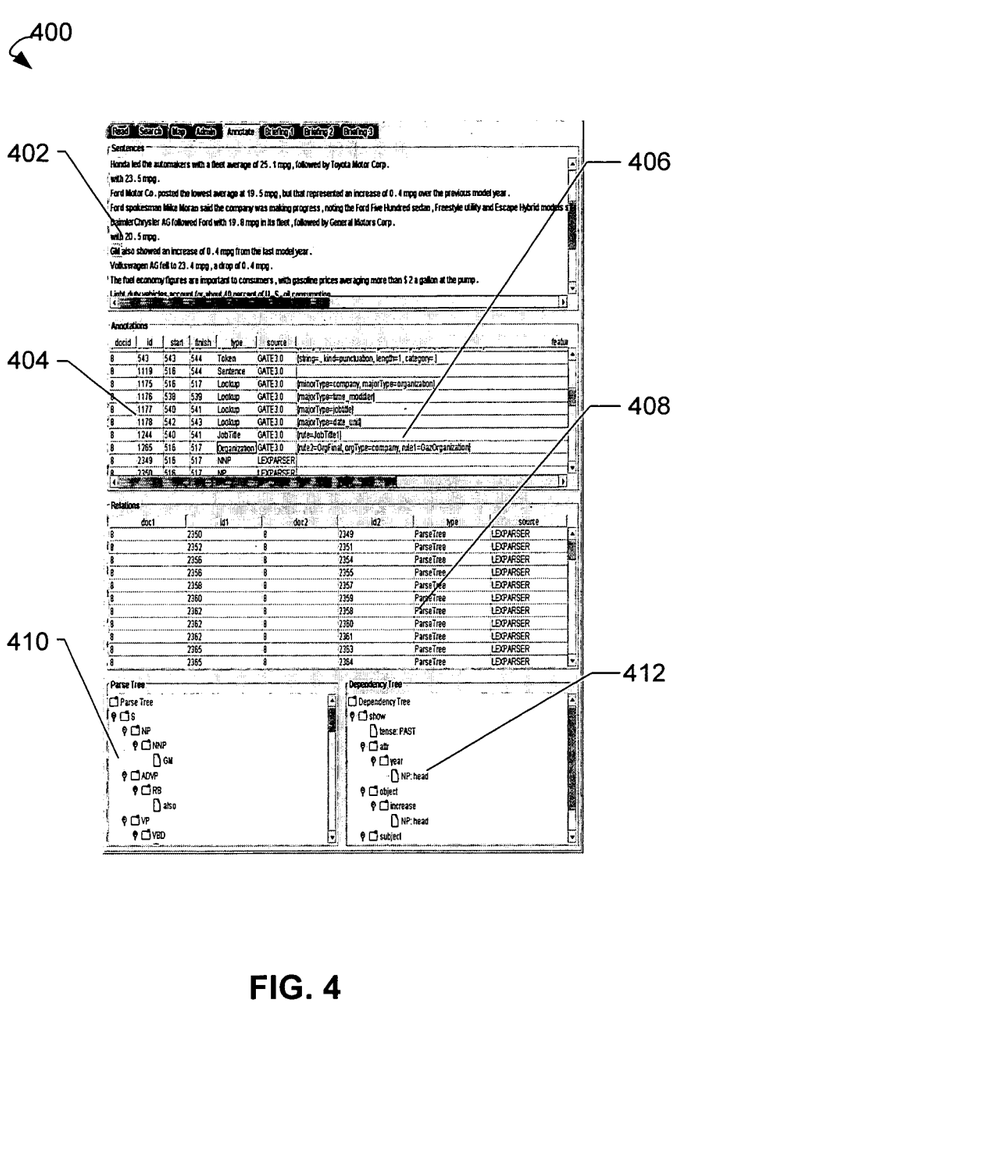
FIG. 4 depicts an exemplary screenshot of an annotations/relations database according to various embodiments.

FIG. 4 depicts an exemplary screenshot 400 of an annotations/relations database 210 according to various embodiments. The annotations/relations database 210 comprises sentences 402 that appear as unstructured content at the information source 102A. The sentence is associated with a set of annotations 404. The annotations 404 may indicate words, sentences, names, locations, dates, and the like. The annotations 404 may include features 406. The features 406 may comprise orthography, properties, and/or values.

The annotations/relations database 210 may further comprise relations 408. The relations 408 indicate whether an annotation is associated with another annotation. The associations may be, for example, grammatical, co-referring, semantic, and/or discourse related.

The annotations/relations database 210 may also comprise trees such as parse tree 410 and/or dependency tree 412. The parse tree 410 organizes syntax of text. For example, the syntax is associated with phrases, word usage, and linguistic structure. The dependency tree 412 organizes the semantics of text. The semantics indicate concepts such as actions, actors, and/or descriptors. In other embodiments, the annotations/relations database 210 may comprise more or less data than depicted in this exemplary embodiment.

Figure 5:
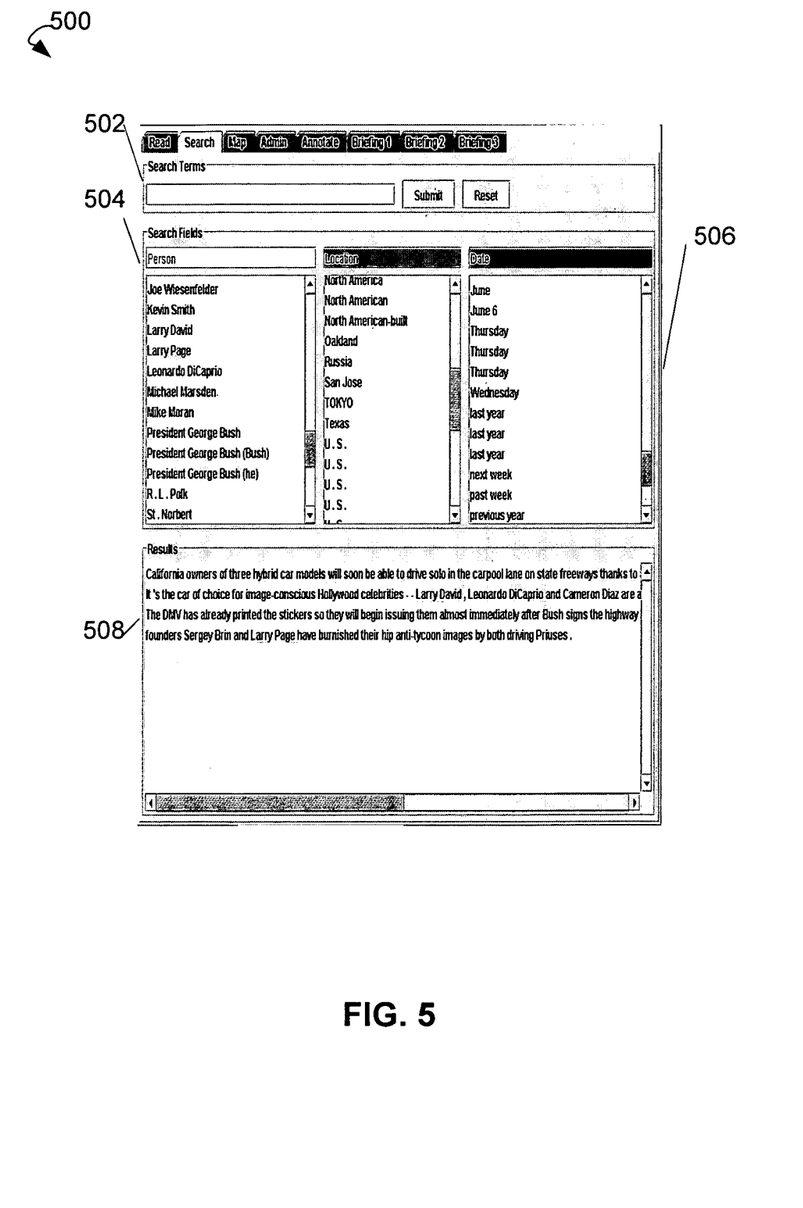
FIG. 5 depicts an exemplary screenshot of a query and a query result according to various embodiments.

FIG. 5 depicts an exemplary screenshot 500 of a query and a query result page according to various embodiments. The screenshot 500 comprises a keyword search window 502. The user may provide keywords or other search criteria via the keyword search window 502. The user may provide and/or supplement the query by selecting search properties 504, such as person, location, and date. Other search properties may include product names, processes, or the like. The user may specify specific values for the search properties 504 using the resolution fields 506. The resolution fields 506 list specific names, places, times, and the like associated with the search properties 504. The results 508, as depicted, include text snippets generated from the annotations described in connection with FIG. 4. In this embodiment, the search values "Larry David," "Leonardo DiCaprio," "Bush," and "Larry Page" are highlighted in the results 508.

FIG. 6 depicts an exemplary screenshot 600 of a time and location briefing associated with a query according to various embodiments. In this embodiment, the briefing is based on locations and times appearing in the information sources 102A through 102N. The briefing may comprise a link to the information source 102A at a location 602 or to the information source 102N at the time 604.

FIG. 7 depicts an exemplary screenshot 700 of a generated competitive intelligence briefing according to various embodiments. The briefing comprises data from multiple sources regarding recent deals in an industry. The names of the mentioned companies are highlighted. Further, links to the information sources 102A through 102N may be provided.

FIG. 8 depicts an exemplary screenshot 800 of a generated product comparison matrix according to various embodiments. The product comparison matrix comprises rating information 802 based on sentiments extracted from the unstructured content at the information sources 102A through 102N. The user may specify further query criteria in the interactive feature 804. In the shown embodiment, the user may select products and/or features associated with those products.

FIG. 9 depicts an exemplary screenshot 900 of a generated product summary according to various embodiments. The information sources 102A through 102N may comprise user or critic reviews of a particular camera. The product summary may include rankings similar to rankings 802. A summary 902 may include text snippets generated from the annotations by the transformation module 214 and/or text from the information source 102A. The summary 902 may include links to the information sources 102A through 102N.

The briefings depicted herein are included for the purpose of illustration only. Other types of briefings will be apparent to those skilled in the art based on the present disclosure. Briefings may, for example, be based on information sources such as regulatory text, electronic documents, sensor data, or the like.

The above-described functions and components may be comprised of instructions that are stored on a storage medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments may be used without departing from the broader scope of the present invention. Therefore, these and other variations upon the exemplary embodiments are intended to be covered by the present invention.

What is claimed is:

1. A method for obtaining information embedded in unstructured text, comprising:
    generating computer-readable annotations based on the unstructured text, at least one of the computer-readable annotations comprising an indication of a linguistic feature;
    generating at least one computer-readable relation between at least one pair of the computer-readable annotations;
    wherein the unstructured text is from two or more different electronic documents, and the relation relates a first annotation from a first one of the electronic documents to a second annotation from a different one of the electronic documents;
    storing characteristic data structures in a database, the characteristic data structures comprising the at least one pair of the computer-readable annotations and the at least one computer-readable relation;
    receiving a query comprising at least one criterion;
    returning results from the database, wherein the results comprise the at least one pair of the annotations and the at least one computer-readable relation;
    generating an information result based on the results that are returned from the database and that comprise the at least one pair of the annotations and the at least one computer-readable relation;
    wherein the relation relates the first annotation to the second annotation based on one or more similarities between contents of the first annotation and the second annotation, and wherein the relation represents a semantic relationship between the contents;
    wherein the information result comprises a grammatical unit not present in its entirety in any of the at least one pair of the annotations and the at least one computer-readable relation returned from the database;
    wherein generating the information result in response to the query includes generating the grammatical unit by applying a transformation to the at least one pair of the annotations and the at least one computer-readable relation returned from the database by combining the at least one pair of the annotations from at least two different sentences from the unstructured text according to the at least one relation to generate the grammatical unit.

2. The method of claim 1, wherein the at least one criterion comprises an indication of a linguistic feature.

3. The method as recited in claim 1, further comprising resolving the unstructured text associated with at least one computer-readable annotation to a normalized form.

4. The method as recited in claim 3, wherein resolving unstructured text is based on word sense disambiguation.

5. The method as recited in claim 3, wherein resolving unstructured text is based on timestamping.

6. The method as recited in claim 3, wherein resolving unstructured text is based on toponym resolution.

7. The method as recited in claim 3, wherein resolving unstructured text is based on co-reference resolution.

8. The method as recited in claim 1, wherein the at least one computer-readable relation comprises an indication of a linguistic feature.

9. The method as recited in claim 1, further comprising generating at least one additional characteristic data structure based on the information result.

10. The method as recited in claim 1, further comprising transforming the information result into a computer readable form for another application.

11. The method as recited in claim 10, wherein transforming the information result is based on data mining.

12. The method as recited in claim 1, further comprising transforming the information result to a human-readable information product comprising any one of a query result page configured for a display screen, a time and location briefing configured for a display screen, a competitive intelligence briefing configured for a display screen, a product comparison configured for a display screen, and a product summary configured for a display screen.

13. The method recited in claim 12, wherein the human-readable information product is based on ranking of information results.

14. The method recited in claim 12, wherein the human-readable information product is based on scoring of information results.

15. The method recited in claim 12, wherein the human-readable information product is a briefing based on the characteristic data structures.

16. The method as recited in claim 12, wherein transforming the information result to a human-readable information product is based on natural language generation by transforming annotations comprising linguistic data structures with a natural language generating engine into one or more complete sentences.

17. The method recited in claim 12, wherein transforming the information result to a human-readable information product is based on automatic text summarization by one or more of: transforming annotations comprising pronouns into preferred names based on entities that the pronouns refer to; applying machine translation to annotations; transforming annotations into synonyms for concepts represented in the annotations; transforming technical jargon into common terminology; or combining multiple annotations into a single natural language sentence.

18. The method as recited in claim 12, wherein the human readable information product comprises human readable text, the human readable text distinguishable from the unstructured text.

19. The method as recited in claim 1, further comprising accessing unstructured text from a plurality of sources.

20. The method as recited in claim 1, wherein generating the computer-readable annotations is based on a lexical feature.

21. The method as recited in claim 1, wherein generating the characteristic data structures is based on a syntactic feature.

22. The method as recited in claim 1, wherein generating the characteristic data structures is based on a semantic feature.

23. The method as recited in claim 1, wherein generating the characteristic data structures is based on a discourse unit feature.

24. The method as recited in claim 1, further comprising converting non-text sources into unstructured text.

25. The method as recited in claim 1, wherein generating the information result is based on a viewpoint.

26. A non-transitory computer readable medium having stored thereon a program, the program executable by a processor for performing a method for obtaining information embedded in unstructured text, the method comprising:
   generating computer-readable annotations based on the unstructured text, at least one of the computer-readable annotations comprising an indication of a linguistic feature;
   generating at least one computer-readable relation between at least one pair of the computer-readable annotations;
   wherein the unstructured text is from two or more different electronic documents, and the relation relates a first annotation from a first one of the electronic documents to a second annotation from a different one of the electronic documents;
   storing characteristic data structures in a database, the characteristic data structures comprising the at least one pair of the computer-readable annotations and the at least one computer-readable relation;
   receiving a query comprising at least one criterion;
   returning results from the database, wherein the results comprise the at least one pair of the annotations and the at least one computer-readable relation;
   generating an information result based on the results that are returned from the database and that comprise the at least one pair of the annotations and the at least one computer-readable relation;
   wherein the relation relates the first annotation to the second annotation based on one or more similarities between contents of the first annotation and the second annotation, and wherein the relation represents a semantic relationship between the contents;
   wherein the information result comprises a grammatical unit not present in its entirety in any of the at least one pair of the annotations and the at least one computer-readable relation returned from the database;
   wherein generating the information result in response to the query includes generating the grammatical unit by applying a transformation to the at least one pair of the annotations and the at least one computer-readable relation returned from the database by combining the at least one pair of the annotations from at least two different sentences from the unstructured text according to the at least one relation to generate the grammatical unit.

27. A method for obtaining information embedded in unstructured text, comprising:
   prior to receiving a query:
      generating computer-readable annotations based on the unstructured text, at least one of the computer-readable annotations comprising an indication of a linguistic feature;
      generating at least one computer-readable relation between at least one pair of the computer-readable annotations;
      wherein a relation, from the at least one computer-readable relation, relates a first annotation from a first electronic document to a second annotation from a second electronic document, which is different than the first electronic document;
      storing characteristic data structures in a database, the characteristic data structures comprising the at least one pair of the computer-readable annotations and the at least one computer-readable relation;
   receiving the query comprising at least one criterion; and
   in response to receiving the query:
      generating an information result in response to the query based on at least one of the characteristic data structures stored in the database by transforming, into a different format, each annotation associated with results from the database based on the query, and scoring and ranking each transformed annotation;
      wherein transforming each annotation comprises performing: transforming annotations comprising pronouns into preferred names based on entities that the pronouns refer to, transforming annotations into synonyms for concepts represented in the annotations, and combining multiple annotations, according to the at least one relation, to generate a single natural language sentence;

wherein the at least one relation relates a first annotation from the multiple annotations to a second annotation from the multiple annotations based on one or more similarities between contents of the first annotation and the second annotation, and wherein the at least one relation represents a semantic relationship between the contents.

28. The method of claim 27, wherein the at least one criterion comprises an indication of a linguistic feature.

29. The method as recited in claim 27, further comprising resolving the unstructured text associated with at least one computer-readable annotation to a normalized form.

30. The method as recited in claim 27, wherein the at least one computer-readable relation comprises an indication of a linguistic feature.

31. The method as recited in claim 27, further comprising generating at least one additional characteristic data structure based on the information result.

32. The method as recited in claim 27, further comprising transforming the information result into a computer readable form for another application.

33. The method as recited in claim 27, further comprising transforming the information result to a human-readable information product comprising any one of a query result page configured for a display screen, a time and location briefing configured for a display screen, a competitive intelligence briefing configured for a display screen, a product comparison configured for a display screen, and a product summary configured for a display screen.

34. The method as recited in claim 27, further comprising accessing unstructured text from a plurality of sources.

35. The method as recited in claim 27, wherein generating the computer-readable annotations is based on a lexical feature.

36. The method as recited in claim 27, wherein generating the characteristic data structures is based on a syntactic feature.

37. The method as recited in claim 27, wherein generating the characteristic data structures is based on a semantic feature.

38. The method as recited in claim 27, wherein generating the characteristic data structures is based on a discourse unit feature.

39. The method as recited in claim 27, further comprising converting non-text sources into unstructured text.

40. The method as recited in claim 27, wherein generating the information result is based on a viewpoint.

41. A non-transitory computer readable medium having stored thereon a program, the program executable by a processor for performing a method for obtaining information embedded in unstructured text, the method comprising:
prior to receiving a query:
generating computer-readable annotations based on the unstructured text, at least one of the computer-readable annotations comprising an indication of a linguistic feature;
generating at least one computer-readable relation between at least one pair of the computer-readable annotations;
wherein a relation, from the at least one computer-readable relation, relates a first annotation from a first electronic document to a second annotation from a second electronic document, which is different than the first electronic document;
storing characteristic data structures in a database, the characteristic data structures comprising the at least one pair of the computer-readable annotations and the at least one computer-readable relation;
receiving the query comprising at least one criterion; and
in response to receiving the query:
generating an information result in response to the query based on at least one of the characteristic data structures stored in the database by transforming, into a different format, each annotation associated with results from the database based on the query, and scoring and ranking each transformed annotation;
wherein transforming each annotation comprises performing: transforming annotations comprising pronouns into preferred names based on entities that the pronouns refer to, transforming annotations into synonyms for concepts represented in the annotations, and combining multiple annotations, according to the at least one relation, to generate a single natural language sentence;
wherein the at least one relation relates a first annotation from the multiple annotations to a second annotation from the multiple annotations based on one or more similarities between contents of the first annotation and the second annotation, and wherein the at least one relation represents a semantic relationship between the contents.

42. The computer-readable medium of claim 41, wherein the at least one criterion comprises an indication of a linguistic feature.

43. The computer-readable medium as recited in claim 41, further comprising instructions which when executed cause resolving the unstructured text associated with at least one computer-readable annotation to a normalized form.

44. The computer-readable medium as recited in claim 41, wherein the at least one computer-readable relation comprises an indication of a linguistic feature.

45. The computer-readable medium as recited in claim 41, further comprising instructions which when executed cause generating at least one additional characteristic data structure based on the information result.

46. The computer-readable medium as recited in claim 41, further comprising instructions which when executed cause transforming the information result into a computer readable form for another application.

47. The computer-readable medium as recited in claim 41, further comprising instructions which when executed cause transforming the information result to a human-readable information product comprising any one of a query result page configured for a display screen, a time and location briefing configured for a display screen, a competitive intelligence briefing configured for a display screen, a product comparison configured for a display screen, and a product summary configured for a display screen.

48. The computer-readable medium as recited in claim 41, further comprising instructions which when executed cause accessing unstructured text from a plurality of sources.

49. The computer-readable medium as recited in claim 41, wherein the instructions cause generating the computer-readable annotations based on a lexical feature.

50. The computer-readable medium as recited in claim 41, wherein the instructions cause generating the characteristic data structures based on a syntactic feature.

51. The computer-readable medium as recited in claim 41, wherein the instructions cause generating the characteristic data structures based on a semantic feature.

52. The computer-readable medium as recited in claim 41, wherein the instructions cause generating the characteristic data structures is based on a discourse unit feature.

53. The computer-readable medium as recited in claim 41, further comprising instructions which when executed cause converting non-text sources into unstructured text.

54. The computer-readable medium as recited in claim 41, wherein the instructions cause generating the information result based on a viewpoint.

55. The method of claim 41, wherein the grammatical unit is one of: a phrase, a clause, or a sentence.

* * * * *